United States Patent Office 3,842,039
Patented Oct. 15, 1974

3,842,039
THREE STAGE PROCESS FOR THE PREPARATION
OF RESINS FROM UREA AND FORMALDEHYDE
Silvio Vargiu, Sesto San Giovanni, and Giorgio Mazzoleni
and Ugo Nistri, Milan, Italy, assignors to Società
Italiana Resine S.I.R. S.p.A., Milan, Italy
No Drawing. Filed Dec. 27, 1972, Ser. No 318,793
Claims priority, application Italy, Dec. 27, 1971,
32,957/71
Int. Cl. C08g 9/10
U.S. Cl. 260—69 R
6 Claims

ABSTRACT OF THE DISCLOSURE

Urea formaldehyde resins are prepared in an initial reaction stage carried out at a basic pH and with high ratios of formaldehyde to urea, in which essentially addition reactions take place between the urea and the formaldehyde, a final stage carried out at a slightly acid pH and with low ratios of formaldehyde to urea, in which essentially condensation reactions take place, with an increase in the molecular weight of the resin being formed and an intermediate stage which is carried out for short periods of time, during which the reaction medium is maintained at relatively low pH values.

---

The present invention relates to a process for the preparation of resins from urea and formaldehyde.

The invention relates more particularly to the use of a continuous process for the preparation of urea-formaldehyde resins having improved chemico-physical characteristics and particularly suitable for the manufacture of chipboard and plywood type panels.

As is already known, resins are prepared from urea and formaldehyde in industry by a process consisting essentially in bringing the reagents into contact, in a first stage of reaction, causing an addition reaction under the influence of alkaline catalysts. Then, in a second stage, an actual condensation reaction takes place, with the liberation of water in the reaction medium and an increase in the molecular weight of the resin.

In the production of urea and formaldehyde resins, many difficulties arise in the monitoring of the characteristic features of the resins themselves, particularly when large reaction volumes are involved.

For example, with a variation in the conditions of working, there is a variation of not only the viscosity, the molecular weight and the distribution of molecular weights in the resin, but also a change in the structural characteristics of the resin itself.

In fact, as several researchers have demonstrated, according to the operating conditions, so it is possible to stress in the resin one or other of the following two structures:

(a) 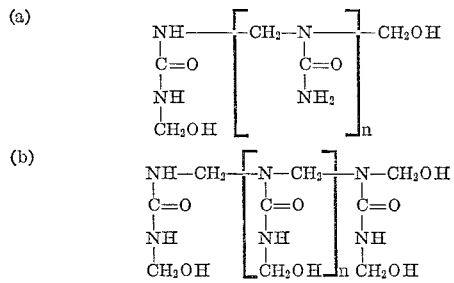

(b)

As the degree of polymerisation "$n$" in structure A increases, so there is a drop in the degree of water miscibility of the resin and an increase in the tendency towards sedimentation of the resin itself when dispersed in water. Furthermore, there tends to be an increase in the time it takes for the resin to harden under the action of ammonium chloride.

With the increase in the degree of polymerisation "$n$" in structure B, there is a rise in water miscibility of the resin, while its stability is increased as a function of time and the hardening times are reduced. To ensure a positive balance of the technological properties of application, it must be possible for both forms to coexist within the same resin.

Therefore, various methods of preparation have been proposed which are capable of influencing those properties of urea-formaldehyde resins such as mean molecular weight, distribution of molecular weights and structure, with which the basic parameters such as stability, dispersibility and adhesive properties of the resin are most closely linked.

In particular in such processes, whether they are continuous or intermittent, attempts have been made to establish those conditions of reaction which make it possible to enhance the characteristics which are desirable in the end product.

For example, it has been found that it is possible to enhance one or other of the desirable properties of the resin by varying the molar ratio of formaldehyde to urea or by dispensing the urea in several stages during preparation of the resin.

However, the factors which favour a specific characteristic of the resin almost always have a negative influence on one or more of the other features of the resin.

For example, when the molar ratio of formaldehyde to urea is reduced, this has the advantage of reducing the amount of free formaldehyde in the resin, but at the same time there is a lessening in the stability of the resin itself, apart from which there is an increase in the times required for hardening under the action of hardeners normally used for the purpose.

Furthermore, the resins obtained in the processes in which all the urea is added to the formaldehyde in the same stage of reaction have, with respect to the resins in which the urea is added in several stages, a shorter hardening time but also a lesser stability and an excessively high content of free formaldehyde. Attempts have also been made in preceding processes to influence the structural characteristics of urea formaldehyde resins either through the times, temperatures and pH of the reaction medium, or above all by introducing particular measures in the preparation of the resins. For example, it has been suggested that the first phases of the process of preparing urea and formaldehyde resins be carried out at low temperatures and in tubes of small diameter in which the extent of blending between the reagents and the products of reaction would be minimal.

Such a manner of proceeding is however troublesome and in any event, for all the reasons stated, the processes of the prior art have to be regarded as unsatisfactory when it is desired to obtain urea formaldehyde resins in which all the desirable properties are present at one and the same time.

It has now been found possible to avoid the drawbacks of the prior art and to obtain urea-formaldehyde resins which have an unusual range of characteristics, particularly with regard to stability, low ratio of formaldehyde to urea, low concentration of free formaldehyde and high rates of setting.

Furthermore, such resins are suitable for the preparation of manufactured articles such as chipboard and plywood panels of high mechanical and chemico-physical properties.

The process of the present invention consists essentially in carrying out the reaction between the urea and the formaldehyde continuously and over a plurality of and preferably three stages of reaction, the ratio of the reagents to one another and the pH of the reaction medium being strictly monitored in every one of the said stages.

More particularly, the process of the present invention comprises an initial reaction stage carried out at a basic pH and with high ratios of formaldehyde to urea, in which essentially addition reactions take place between the urea and the formaldehyde, a final stage carried out at a slightly acid pH and with low ratios of formaldehyde to urea, in which essentially condensation reactions take place, with an increase in the molecular weight of the resin being formed, and it is essentially characterised in that between the said initial and final stages there is an intermediate stage which is carried out for short periods of time, during which the reaction medium is maintained at relatively low pH values.

We would stress that the introduction of the said intermediate stage is essential in the process of the present invention, in order to obtain urea and formaldehyde resins having improved properties, particularly suitable for use in the production of manufactured goods such as chipboard and plywood panels.

More particularly according to the process of the present invention, in the first stage of reaction, formaldehyde and urea are brought into contact in an aqueous reaction medium, molar ratios of formaldehyde to urea equal to or greater than 2:1, for example up to 2.7:1 being maintained. In this stage of reaction, the pH values of the reaction medium range from 8 to 9.5 while the working temperatures range from 60 to 95° C.

In this stage, the contact times are maintained at between 15 and 50 minutes; in any case, these times are preferably chosen in such a way that a product of reaction is discharged which has a viscosity of 12 to 22 secs. measured at 25° C. in a No. 4 Ford cup.

According to another form of embodiment of the present invention, urea and the fluid products of reaction of urea with formaldehyde, commonly known in the art as "formurea" or "ureic syrup" are supplied to the first stage of the reaction.

Obivously the quantity of urea and formurea supplied to the first stage will be such as to ensure a molar ratio of formaldehyde to urea equal to or greater than 2:1.

Furthermore, the working conditions entail a basic pH in the reaction medium, a temperature within the range described and working times such as will allow discharge of a product of reaction with a viscosity of 12 to 22 secs. measured as stated.

The product of reaction emanating from the first stage is then supplied continously to the second stage of reaction in which relatively low pH levels, generally of 4 to 5.5 are maintained. For this purpose, formic acid, normally in the form of a dilute aqueous solution, is supplied to the second stage of reaction.

Urea is not supplied to the second stage, and therefore the molar ratios of formaldehyde to urea are the same as those of the first stage. Furthermore, in the second stage of reaction, the temperature is kept within the range described for the first stage, while the contact time is rather short, generally between 4 and 10 minutes.

In any case, the conditions are preferably so regulated that the product of reaction discharged has a viscosity of 35 to 65 secs. measured in the usual way.

In the next step it is a fundamental aspect of the process of the present invention that the product discharged from the second stage of reaction is brought to approximately neutral pH values.

For this purpose, for example, sodium hydroxide or some other inorganic base is supplied to the product leaving the second stage, so that the resultant pH is between 6.8 and approximately 7.5.

Preferably, the inorganic base is added at a point close to the discharge from the second stage.

Thus neutralised, the product is supplied continuously to the third stage of reaction together with a sufficient quantity of urea to ensure in that stage a molar ratio of 1.40:1 to 1.65:1 between formaldehyde and urea.

In this stage of reaction, the working temperature is equal to that of the preceding stages while the pH is maintained at between 5.7 and 6.8.

In order to maintain such pH values, formic acid is normally also added to the third stage of reaction. The contact times are furthermore preferably selected so that a reaction product is discharged which has a viscosity of 70 to 100 secs., measured in the usual way. Such contact times are normally comprised between 60 and 240 mins.

In a preferred form of embodiment, the third stage of reaction is modified to be carried out over a plurality of phases, with decreasing values of molar ratio of formaldehyde to urea.

In practice, it is appropriate to employ two phases of reaction in such a modified third stage and, in the first of these, to maintain a molar ratio of formaldehyde to urea of 1.65:1 to 1.80:1 and in the second, a ratio of 1.40:1 to 1.65:1 as before.

For this purpose, urea is supplied to every individual phase, in such a quantity as to bring the molar ratio within the ranges described.

Furthermore, in each of the said phases, the pH of the medium and the temperature are maintained within the range of values described for the third stage and the overall contact time should preferably be such as will allow discharge of an end product having a viscosity within the previously defined limits.

The product of reaction discharged from the third stage is finally cooled, while the pH is brought to approximately 8, as by the addition of sodium hydroxide or another inorganic base.

The process of the present invention has above all the advantages inherent in continuity of operation compared with discontinuous operation, in other words a greater yield in a period of time per effective unit of volume of the reactor, a greater possibility for automation of the plant and a greater constancy in the characteristics of the product obtained.

In addition, the process of the present invention is easy to carry out in that the various stages of reaction are carried out in autoclaves fitted with an agitator, thus avoiding the drawbacks inherent in those prior art processes which use tubular reactors of small diameter.

The urea formaldehyde resins obtained by the process described also have a number of characteristic features which cannot be found in the prior art resins.

It is in fact well known that the stability of urea and formaldehyde resins diminishes in course of time with a decrease in the molar ratio of formaldehyde to urea, while the hardening times increase as this ratio diminishes. The resins obtained by the process of the present invention are stable over a period of time and have relatively short hardening times, even when the formaldehyde to urea ratios are as low as 1.5:1 or even less.

Another advantage of the resins of the present invention resides in the low content of free formaldehyde, generally equal to or less than 1% by weight.

As is well known, the hardening of the resins brought about by ammonium chloride depends upon the reaction of ammonium chloride with formaldehyde, since such a reaction generates hydrochloric acid which causes cross-linking of the resin.

Therefore, it is surprising that in the resins of the present invention, the rate of hardening is relatively high, having regard to the low content of free formaldehyde.

Finally, the nature of the resins obtained by the process described is such as to render them useful in the manufacture of chipboard and plywood panels, as will become evident from the following examples of experiments. These examples are based on a urea-formaldehyde or formurea precondensate having the following characteristics:

(1) Formaldehyde content (total)=59 to 60%
(2) Urea content (total)=24 to 24.6%
(3) Free formaldehyde=20.7 to 21.9
(4) Semi-combined formaldehyde=36.6 to 37.4
(5) Specific gravity at 25° C.=1.320 to 1.326
(6) Viscosity at 25° C. in a No. 4 cup=65 to 85 secs.
(7) pH=8 to 9
(8) Hazen colour=15 (maximum)
(9) Ash=0.025% (maximum)
(10) Methanol=0.7% (maximum).

Characteristics (1) and (2) are shown as percentages by weight.

The free formaldehyde is determined by neutralising a specimen of formurea and adding measured quantities of aqueous acetic acid of known titre and saturated solution of sodium sulphite. Finally, the excess of acid is titrated by means of aqueous sodium hydroxide.

The semi-combined formaldehyde is determined by treatment with an excess of iodine in an alkaline ambient and then titrating the iodine excess with thiosulphate. In this way, it is possible to determine the total quantity of free formaldehyde and semi-combined formaldehyde (or formaldehyde methylolate). By taking the difference, one obtains the quantity of formaldehyde present in semi-combined form.

EXAMPLE 1

In a stainless steel autoclave are placed 2494 parts by weight of formurea, 630.6 parts by weight of water and 1187 parts by weight of urea. The mixture is heated under agitation to 90° C. and after 15 minutes, formic acid is added to bring the pH to between 5.1 and 5.2. A temperature of 90° C. is maintained until the product has a viscosity equal to 55 to 60 secs. measured in a No. 4 Ford cup at 25° C.

Sodium hydroxide is then added to bring the pH of the mixture to 6.5 to 6.6, and condensation is continued at 90° C. until the viscosity becomes 83 to 86 secs. measured in a No. 4 Ford cup at 25° C.

Rapid cooling then follows, sodium hydroxide being used to neutralise the medium to a pH of approximately 8.

EXAMPLE 2

In a stainless steel autoclave are placed 2494 parts by weight of formurea, 630.6 parts by weight of water and 743.2 parts by weight of urea. While it is being stirred, the mixture is heated to 90° C. and after 15 minutes formic acid is added to bring the pH value to 5.1 to 5.2. The temperature of 90° C. is maintained until the viscosity in a No. 4 Ford cup becomes 40 to 42 secs. at 25° C., then sodium hydroxide is added to bring the pH value to 7 to 7.5.

Then 309.2 parts by weight of urea are added and the temperature of 90° C. and the pH of 6.5 to 6.6 are maintained until a product is obtained which has a viscosity of 60 to 62 secs. measured in a No. 4 Ford cup at 25° C.

Then, 134.6 parts by weight of urea are added and a temperature of 90° C. and a pH of 6.5 to 6.6 are maintained, followed by condensation to 83 to 86 secs. measured as above.

The mixture is then cooled rapidly and neutralised with sodium hydroxide to a pH of approximately 8.

EXAMPLE 3

4041 kg./hr. of formurea and 1783 kg./hr. of a urea solution containing 64.5% by weight of water are placed in a first stainless steel reactor.

The working temperature in this reactor is 85° C. and a contact time of aproximately 30 minutes is observed.

The product discharged continuously from the first reactor is passed to a second stainless reactor to which 28 kg./hr. of formic acid are also supplied, in an aqueous solution with an acid concentration equal to 5% by weight. In this phase, the working pH is 4.9 to 5.2 and the contact time is equal to approximately 8 minutes.

Thus, a product is continuously discharged with a viscosity of 50 to 55 secs. measured at 25° C. in a No. 4 Ford cup. This product is then brought to pH 6.8 to 7.1 with 12 kg./hr. of aqueous sodium hydroxide solution at a rate of 10% by weight and passed to a third stainless steel reactor which is maintained at 90° C., to which are supplied 440 kg./hr. of aqueous solution of urea containing 65.4% by weight of water and 10 kg./hr. of aqueous solution of formic acid with an acid concentration equal to 5% by weight.

In this way, the pH in the third reactor is brought to 6.1 to 6.4 and, after a dwell time equal to approximately 1 hour, a product with a viscosity of 40 to 45 secs. measured in the above way is discharged continuously from the said reactor.

The product is then passed to a fourth stainless steel reactor together with 694 kg./hr. of an aqueous solution of urea containing 65.4% by weight of water. In this phase, the working temperature is approximately 90° C. and the pH of the reagent medium is 6.6 to 6.8.

With a contact time of approximately 2 hours, a product is discharged which has a viscosity of 83 to 86 secs. measured as above. 20 kg./hr. of a 10% aqueous sodium hydroxide solution are added continuously to the discharged product to bring the pH to approximately 8, after which the product of reaction is cooled.

EXAMPLE 4

2327.2 parts by weight of formurea, 667.2 parts by weight of water and 1249.4 parts by weight of urea are placed in a stainless steel autoclave. The mixture is stirred and heated to 90° C. After 15 minutes, formic acid is added, adjusting the pH to 5.1 to 5.2. Condensation is carried out at 90° C. until the viscosity is equal to 55 to 60 secs., measured at 25° C. in a No. 4 Ford cup.

Then, sodium hydroxide is added, adjusting the pH to 6.5 to 6.6 and condensation is continued at 90° C. until the viscosity is 83 to 86 secs., measured as above.

Rapid cooling follows, sodium hydroxide being used to neutralise to a pH of approximately 8.

EXAMPLE 5

2327.2 parts by weight of formurea, 667.2 parts by weight of water and 798.2 parts by weight of urea are placed in a stainless steel autoclave.

While it is being stirred, the mixture is heated to 90° C. After 15 minutes, formic acid is added, adjusting the pH to 5.1 to 5.2.

Condensation is carried out at 90° C. to a viscosity of 40 to 42 secs. at 25° C. measured in a No. 4 Ford cup and then sodium hydroxide is added to bring the pH to 7.0 to 7.5.

316.2 parts by weight of urea are added and the whole condensed at 90° C. and a pH of 6.5 to 6.6 until the viscosity, measured in the usual way, is 60 to 62 secs.

Then, 134.6 parts by weight of urea are added and while the temperature is still kept at 90° C. and the pH at 6.5 to 6.6, the mixture is condensed to a viscosity of 83 to 86 secs. Finally, the medium is cooled rapidly while sodium hydroxide is added to bring the pH of the reaction product to approximately 8.

EXAMPLE 6

3765 kg./hr. of formurea, 1620 kg./hr. of an aqueous urea solution containing 71% by weight of water and 280 kg./hr. of water are fed to a first stainless steel reactor in which the working temperature is 85° C. and the contact time is equal to approximately 31 mins.

The product which is continuously discharged from the first reactor is passed to a second stainless steel reactor to which are also fed 52 kg./hr. of formic acid (in aqueous solution with an acid concentration equal to 5% by weight). In this phase, the pH value is 4.9 to 5.2 and the contact time is approximately 6 minutes.

Thus, a product is continuously discharged which has a viscosity of 40 to 44 secs. measured at 25° C. in a No. 4 Ford cup.

This product is then brought to a pH of 6.8 to 7.1 by the addition of 17 kg./hr. of aqueous sodium hydroxide solution at the rate of 10% by weight and passed to a third stainless steel reactor which is maintained at 90° C., to which 521 kg./hr. of aqueous urea solution containing 71% by weight of water and 10 kg./hr. of aqueous formic acid with an acid concentration equal to 5% by weight are fed.

In this way, the pH in the third reactor is brought to 6.1 to 6.4 and after a dwell time equal to approximately 45 minutes, a product is continuously discharged from that reactor which has a viscosity of 44 to 47 secs.

The product is then passed to a fourth stainless steel reactor together with 704 kg./hr. of aqueous solution of urea containing 71% by weight of water. The working temperature in this phase is 90° C. and the pH of the reaction medium is 6.6 to 6.8. With a contact time equal to approximately 2 hours, a product is discharged which has a viscosity of 83 to 86 secs.

To the product which is continuously discharged are added 17 kg./hr. of 10% aqueous solution of sodium hydroxide in order to bring the pH to approximately 8, which is followed by cooling of the reaction product.

Examples 1 and 2 are given by way of comparison; in those examples, the molar ratio of formaldehyde to urea in the products of reaction is equal to 1.65:1.

Example 3 is carried out according to the process of the present invention and the ratio of formaldehyde to urea in the products of reaction is equal to 1.65:1.

Examples 4 and 5 are for comparison and in those examples the molar ratio of formaldehyde to urea in the products of reaction is equal to 1.5:1.

Example 6 is carried out according to the process of the present invention and a molar ratio of formaldehyde to urea in the products of reaction is equal to 1.5:1.

Table 1 shows the characteristic feature of the urea formaldehyde resins obtained in Examples 1 to 6. More particularly, the said table shows:

(1) Viscosity: measured in a No. 4 Ford cup at 25° C. (in seconds)
(2) pH
(3) Free formaldehyde as a percentage by weight
(4) Semi-combined formaldehyde as a percentage by weight
(5) Compatability in water
(6) Hardening time at 60° C.
(7) Dry substance as a percentage by weight
(8) Specific gravity at 20° C.
(9) Stability in months.

The figure for free formaldehyde is determined by oxidising the said formaldehyde to formic acid by means of hydrogen peroxide, neutralising the said acid with an excess of aqueous sodium hydroxide and finally titrating the excess of sodium hydroxide.

The figure for semi-combined formaldehyde is determined in a manner similar to that described for formurea. Wate compatibility is determined by placing in a 100 ml. Nessler tube 40 ml. of the resin under examination, diluted with water to 50%. Small portions of distilled water are added at 25° C. until the mixture clouds. The compatibility in water is thus expressed as parts by volume of liquid resin to parts by volume of water.

The hardening time is determined by adding to 100 g. of resin 10 ml. of a solution comprising urea (5 parts by weight), ammonium chloride (5 parts by weight) and water (90 parts by weight).

The homogenised mixture is poured into a vessel which is thermostatically controlled at 60° C. and the hardening time is regarded as the period elapsing between introduction of the mixture into the thermostatically controlled ambient until the mixture gels.

The stability in months is determined by maintaining a specimen of 500 g. of resin at 20° C. and monitoring the viscosity as a function of the time.

When the viscosity in a No. 4 Ford cup at 25° C. exceeds 300 secs., the product is regarded as useless.

The time elapsing before a viscosity of 300 secs. is reached, expressed in months, is the stability time.

Table 2 shows the characteristic features of chipboard panels obtained by using the urea formaldehyde resins according to Examples 1 to 6. The chipboard panels are made up in the following way. A mixture is prepared from 100 parts by weight of urea formaldehyde resin, 20 to 30 parts by weight of water and 1 part by weight of ammonium chloride.

The mixture is sprayed onto wood chips which have been previously dried so as to achieve a weight ratio of wood to dry resin equal to 100:10.

The resin treated chips are used for making, by a settling process, a mat which is carried on a conveyor belt and which is first pressed cold under 15 to 30 kg./sq. cm. pressure and then introduced into a multi-level press in which, by the effect of heat (150 to 170° C.) and pressure (25 to 30 kg./sq. cm.), the resin is polymerised and the chipboard panel is formed.

The panel extracted from the press is conditioned at ambient temperature after which it is squared off and smoothed. The following specifications are to be found in chipboard panels which are prepared as described:

(1) Flexion strength in kg./sq. cm., according to DIN 52362 standards.
(2) Transverse tensile strength in kg./sq. cm. to DIN 53365 standards.
(3) Apparent density in gr./cc. to DIN 52361 standards.
(4) Swelling in water after two hours at 20° C. (as a percentage by weight), to DIN 52364 standards.
(5) Swelling in water after 24 hours at 20° C. (as a percentage by weight), to DIN 52364 standards.
(6) Green cohesion. This property is assessed by treating poplar chips with resin in a suitable apparatus fitted with a spray, so as to have dry resin on dry chipboard (percentage by weight): 10; moisture content of the chips (as a percentage by weight) with respect to the dry chipboard: 13±2.

A mat is made up manually to dimensions 30 x 40 cm. using 1 kg. of the resin treated chips. It is then pressed cold for 10 secs. at 22 kg./sq. cm. The green cohesion is assessed manually as a function of the consistency of the panel according to the following scale having extreme values:

Highly consistent=500
Not very consistent=600.

Tables 3 and 4 show the figures for specifications of the plywood obtained by using the urea formaldehyde resins according to Examples 1 to 6. In particular, these plywoods were obtained in the following way:

A mixture was prepared from:

| | Parts by weight |
|---|---|
| Urea formaldehyde resin | 100 |
| Water | 50–70 |
| Organic flours | 40–50 |
| Ammonium chloride | 1 |

Using a roller spreader, this mixture was applied on previously dried plies of wood at the rate of 180 to 230 g. to every sq. m. of surface area.

An odd number of these pieces of wood are then superimposed on one another to form a package, the fibres in the alternate layers being at 90° with respect to those of adjacent layers.

The package is pressed in a press in which, under the effect of heat (approximately 100° C.) and pressure (7 to 12 kg./sq. cm.), the resin polymerises, resulting in formation of the plywood.

The plywood removed from the press is conditioned at ambient temperature and is finally squared off and smoothed.

Tests are then carried out on the plywood to establish:

(1) Tearing effect when cut
(2) Resistance to cutting by traction in kg./sq. cm.
(3) Percentage of fibres left.

These three tests are all carried out in accordance with British Standards specifications No. 1455/1963.

Table 4 shows the same characteristics as Table 3 recorded on plywood after immersion in water at approximately 20° C. for 16 to 24 hours (British Standard No. 1455/1963).

TABLE 1

| Characteristics | Ex. 1 | Ex. 2 | Ex. 3 | Ex. 4 | Ex. 5 | Ex. 6 |
|---|---|---|---|---|---|---|
| Resin: | | | | | | |
| Viscosity | 110 | 130 | 130 | 110 | 130 | 130 |
| pH | 8 | 7.9 | 7.9 | 8.4 | 8.0 | 8.0 |
| Free formaldehyde | 1.4 | 1.1 | 1.0 | 1.3 | 1.0 | 0.8 |
| Semi-combined formaldehyde | 20.6 | 18.7 | 18.0 | 19.2 | 19.0 | 18.0 |
| Compatibility in water | 1:1.3 | 1:3.2 | 1:3.2 | 1:0.7 | 1:2 | 1:2 |
| Hardening time: | | | | | | |
| Minutes | 4 | 6 | 7 | 9 | 13 | 12 |
| Seconds | 50 | 50 | 30 | 55 | 40 | |
| Dry matter | 64.8 | 66.7 | 66.7 | 65.1 | 66.1 | 66. |
| Specific gravity | 1.291 | 1.288 | 1.289 | 1.290 | 1.287 | 1.28 |
| Stability | <2 | <4 | 4.5 | <1 | <2 | 2. |

TABLE 2

| | Ex. 1 | Ex. 2 | Ex. 3 | Ex. 4 | Ex. 5 | Ex. 6 |
|---|---|---|---|---|---|---|
| Characteristics of chipboard: | | | | | | |
| Bending strength | 227 | 210 | 225 | 187 | 227 | 220 |
| Transverse tensile strength | 4.1 | 4.1 | 4.1 | 3.5 | 4.2 | 4.0 |
| Apparent density | 0.74 | 0.74 | 0.74 | 0.74 | 0.74 | 0.74 |
| Swelling in water (2 hours) | 10.5 | 10.7 | 10.8 | 14.9 | 11.8 | 11.8 |
| Swelling in water (24 hours) | 15.5 | 14.3 | 14.8 | 20.2 | 16.2 | 16.0 |
| Green cohesion | 545 | 545 | 540 | 545 | 540 | 545 |

TABLE 3

| | Ex. 1 | Ex. 2 | Ex. 3 | Ex. 4 | Ex. 5 | Ex. 6 |
|---|---|---|---|---|---|---|
| Characteristics of plywood: | | | | | | |
| Resistence to cutting | 6-7 | 6-7 | 6-7 | 6-7 | 5-6 | 6 |
| Resistance to cutting by traction (kg./sq. cm.) | 18.4 | 18.3 | 18.5 | 18.7 | 21.8 | 21.0 |
| Percent of fibres remaining | 55 | 80 | 85 | 65 | 90 | 90 |

TABLE 4

| | Ex. 1 | Ex. 2 | Ex. 3 | Ex. 4 | Ex. 5 | Ex. 6 |
|---|---|---|---|---|---|---|
| Characteristics of plywood: | | | | | | |
| Resistance to cutting | 0 | 0 | 0 | 0 | 0 | 0 |
| Resistance to cutting by traction (kg./sq.cm.) | 14.2 | 12 | 13.6 | 8.3 | 10.5 | 11 |
| Percent of fibres remaining | 45 | 0 | 40 | 5 | 0 | 5 |

What we claim is:

1. Process for the continuous preparation of urea formaldehyde resins characterised:

in a first stage of reaction, by the supply of urea and formaldehyde in molar ratios of formaldehyde to urea of 2:1 to 2.7:1 and in that stage working at temperatures of 60 to 95° C. with the pH of the aqueous reaction medium ranging from 8 to 9.5, the contact time being from 15 to 50 minutes;

by supplying the product from the first stage to a second stage of reaction together with formic acid and, in the said second stage, working at temperatures of 60 to 95° C. with a pH in the aqueous reaction medium of 4.0 to 5.5, the contact time being from 4 to 10 minutes;

by neutralising the product discharged from the second stage to a pH of 6.8 to 7.5;

by supplying the said neutralised product to a third stage of reaction together with urea and working in that third stage with molar ratios of formaldehyde to urea of 1.40:1 to 1.65:1, at temperatures of 60 to 95° C. with a pH in the reaction medium of 5.7 to 6.8 and the contact time being between 60 and 240 minutes;

by cooling the urea formaldehyde resin discharged from the third stage and bringing its pH value to approximately 8.

2. Process according to Claim 1, characterised in that in the first stage of reaction, the formaldehyde is supplied, together with half of the urea in the form of formurea.

3. Process according to Claim 1, characterised in that the third stage of reaction is modified and two successive phases are employed, the first of the said phases being carried out with a molar ratio of formaldehyde to urea of 1.65:1 to 1.80:1, the second of the said phases being carried out with a molar ratio of formaldehyde to urea of 1.40:1 to 1.65:1.

4. Process according to Claim 1, characterised in that discharged from the first stage of reaction is a product with a viscosity of 12 to 22 secs. measured at 25° C. in a No. 4 Ford cup.

5. Process according to Claim 1, characterised in that discharged from the second stage of reaction is a product with a viscosity of 35 to 65 secs. measured at 25° C. in a No. 4 Ford cup.

6. Process according to Claim 1, characterised in that discharged from the third stage of reaction is a product with a viscosity of 70 to 100 secs. measured at 25° C. in a No. 4 Ford cup.

References Cited
UNITED STATES PATENTS

| 2,625,524 | 1/1953 | Kvalnes | 260—69 X |
| 3,067,177 | 12/1962 | Greco et al. | 260—69 |
| 3,198,761 | 8/1965 | O'Donnell | 260—69 X |
| 3,712,879 | 1/1973 | Strickrodt et al. | 260—69 |

HOWARD E. SCHAIN, Primary Examiner

U.S. Cl. X.R.

117—148; 161—261; 260—29.4 R